(12) United States Patent
Hori et al.

(10) Patent No.: US 6,763,736 B2
(45) Date of Patent: Jul. 20, 2004

(54) TRANSMISSION

(75) Inventors: Yoshiaki Hori, Saitama (JP); Tohru Nishi, Saitama (JP); Seiji Hamaoka, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/269,003

(22) Filed: Oct. 11, 2002

(65) Prior Publication Data

US 2003/0121341 A1 Jul. 3, 2003

(30) Foreign Application Priority Data

Oct. 19, 2001 (JP) ........................................ 2001-321944

(51) Int. Cl.[7] ............................................... F16H 3/08
(52) U.S. Cl. ......................................................... 74/329
(58) Field of Search ........................... 74/329, 331, 325

(56) References Cited

U.S. PATENT DOCUMENTS

| | | | | |
|---|---|---|---|---|
| 4,864,881 A | * | 9/1989 | Beeson et al. ................. | 74/360 |
| 4,938,085 A | * | 7/1990 | Suzuki et al. ................. | 74/15.2 |
| 5,178,039 A | * | 1/1993 | Shirley et al. ............. | 74/329 X |
| 5,218,885 A | * | 6/1993 | Nakano et al. ........... | 74/331 X |
| 5,243,870 A | * | 9/1993 | Hatakeyama ................. | 74/331 |
| 6,497,211 B2 | * | 12/2002 | Nomura et al. ......... | 123/195 R |
| 2002/0144563 A1 | * | 10/2002 | Forsyth .................... | 74/329 X |

* cited by examiner

Primary Examiner—Roger Pang
(74) Attorney, Agent, or Firm—Birch, Stewart, Kolasch & Birch, LLP

(57) ABSTRACT

A hydraulic clutch and a torque converter, a crank web or an alternator provided in separate locations, except opposite positions, for avoiding interference. A crankcase is provided in a transmission for transmitting the revolution of the torque converter to a crankshaft to a main shaft via a gear. Shifting speed in three steps is achieved by a gear provided on the main shaft and a counter shaft and the hydraulic clutch for connecting or disconnecting the gear. One hydraulic clutch is arranged on a main shaft outside a pair of supports for supporting the main shaft, two gears are fixed to the main shaft inside the supports for supporting the main shaft and on both sides close to the support. The two gears engaged with the two gears and hydraulic clutches for connecting or disconnecting each gear are arranged between the two gears.

14 Claims, 8 Drawing Sheets

TRANSMISSION

CROSS-REFERENCE TO RELATED APPLICATIONS

The present application claims priority under 35 USC 119 to Japanese Patent Application No. 2001-321944 filed on Oct. 19, 2001 the entire contents thereof is hereby incorporated by reference.

BACKGROUND OF THE INVENTION

1. Field of the Invention

The present invention relates to a transmission of a power unit in which an internal combustion engine and the transmission, respectively, for a four-wheel buggy (a saddle-type vehicle for operating on a wasteland) are integrated.

2. Description of Background Art

In a case where three hydraulic clutches are provided to shift between a main shaft and a counter shaft of a transmission, the three clutches are divided into one and two and one clutch and two clutches are arranged on two shafts so as to reduce the axial length of equipment and to simplify hydraulic fluid supply structure. As a center distance is increased when clutches on two shafts are arranged in opposite positions, the center distance is reduced by setting the clutches off in positions that are not opposite. Careful consideration is given to these as problems in the transmission.

In the meantime, heretofore, sufficient consideration is not given to the reduction of the center distance between a crankshaft and a shaft of a transmission, for avoiding interference between a clutch and a torque converter, interference between the clutch and a crank web or interference between the clutch and an alternator.

In the case where a hydraulic clutch is provided on a main shaft of a transmission opposite to a crank web of a crankshaft and an alternator, the center distance between the crankshaft and the main shaft is required to be increased to avoid interference between the equipment. As the outside diameter of a primary driven gear is also increased when the center distance is increased, a crankcase is of a large-sized and the weight is also increased. Particularly, in the case where a crankshaft is arranged longitudinally like a four-wheel buggy (a saddle-type vehicle for operating on a wasteland), the large-size of the crankcase due to an increase of the center distance has a large effect upon the space at the rider's feet. Thus, riding comfort and operability at the rider's feet are greatly impaired. It is not desirable in a four-wheel buggy that a hydraulic clutch is provided on a main shaft opposite to a crank web of a crankshaft and an alternator provided on the crankshaft.

SUMMARY AND OBJECTS OF THE INVENTION

The object of the invention is to provide a transmission in which a crankcase is miniaturized and the weight is reduced by providing all three hydraulic clutches at separate locations except the opposite positions without providing a hydraulic clutch on a main shaft opposite to a torque converter, a crank web and an alternator.

The present invention is made to solve the above-identified problems and is based upon a transmission provided with a main shaft and a counter shaft respectively provided in parallel with a crankshaft for transmitting the revolution of a torque converter provided to the crankshaft to the main shaft via a gear. Further the present invention provides for a shifting speed of at three steps by a gear provided on the main shaft and the counter shaft and a hydraulic clutch for connecting or disconnecting the gear. One hydraulic clutch is arranged on the main shaft outside a pair of supports for supporting the main shaft with two gears being fixed apart on the main shaft on both sides close to the support inside the supports for supporting the main shaft and two gears engaged with the two gears fixed to the main shaft and revolvable on the counter shaft. The two gears are arranged in positions on the counter shaft opposite to the insides of the supports of the main shaft and the separate hydraulic clutches for connecting or disconnecting each gear arranged between the two revolvable gears.

As the invention is configured as described above, one clutch provided to the main shaft can be installed in a position not opposite to the crank web and the alternator to avoid interference therewith. As the two clutches are not provided to the main shaft and are installed on the side of the counter shaft, no interference is caused with the torque converter, the crank web and the alternator.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
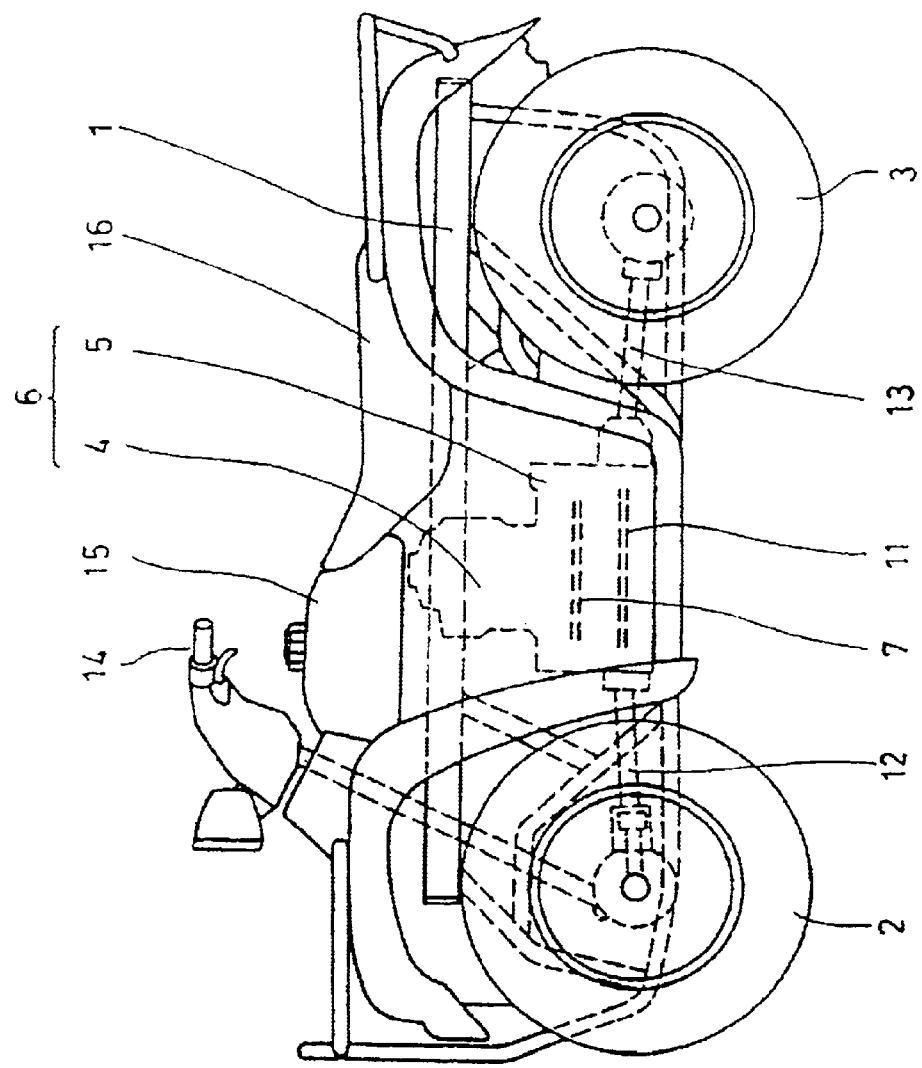
FIG. 1 is a side view showing a four-wheel buggy (a saddle-type vehicle for operating on wasteland) in which an internal combustion engine according to the invention is mounted.

FIG. 1 is a side view showing a four-wheel buggy (a saddle-type vehicle for operating on wasteland) in which an internal combustion engine provided with a hydraulic automatic transmission according to the invention is mounted.

The buggy is provided with a pair of right and left front wheels 2 and a pair of right and left rear wheels 3 in the front and in the rear of a body frame 1. In the center of the body frame 1, a power unit 6 is mounted wherein an internal combustion engine 4 and a transmission 5 are integrated. The power unit 6 is arranged with a crankshaft 7 directed in a longitudinal direction of the body. The rotation of the crankshaft 7 is transmitted to an output shaft 11 via the main shaft 8 of the transmission, a counter shaft 9 and an intermediate shaft 10, respectively, shown in FIG. 4. These shafts are parallel to the crankshaft and are arranged in the longitudinal direction of the body. The front wheel 2 is driven by a front wheel driving shaft 12 connected to the front end of the output shaft 11 and the rear wheel 3 is driven by a rear wheel driving shaft 13 connected to the rear end of the output shaft 11. On the upside of the body, a steering handlebar 14, a fuel tank 15 and a saddle-type seat 16 are equipped in that order from the front.

Figure 2:
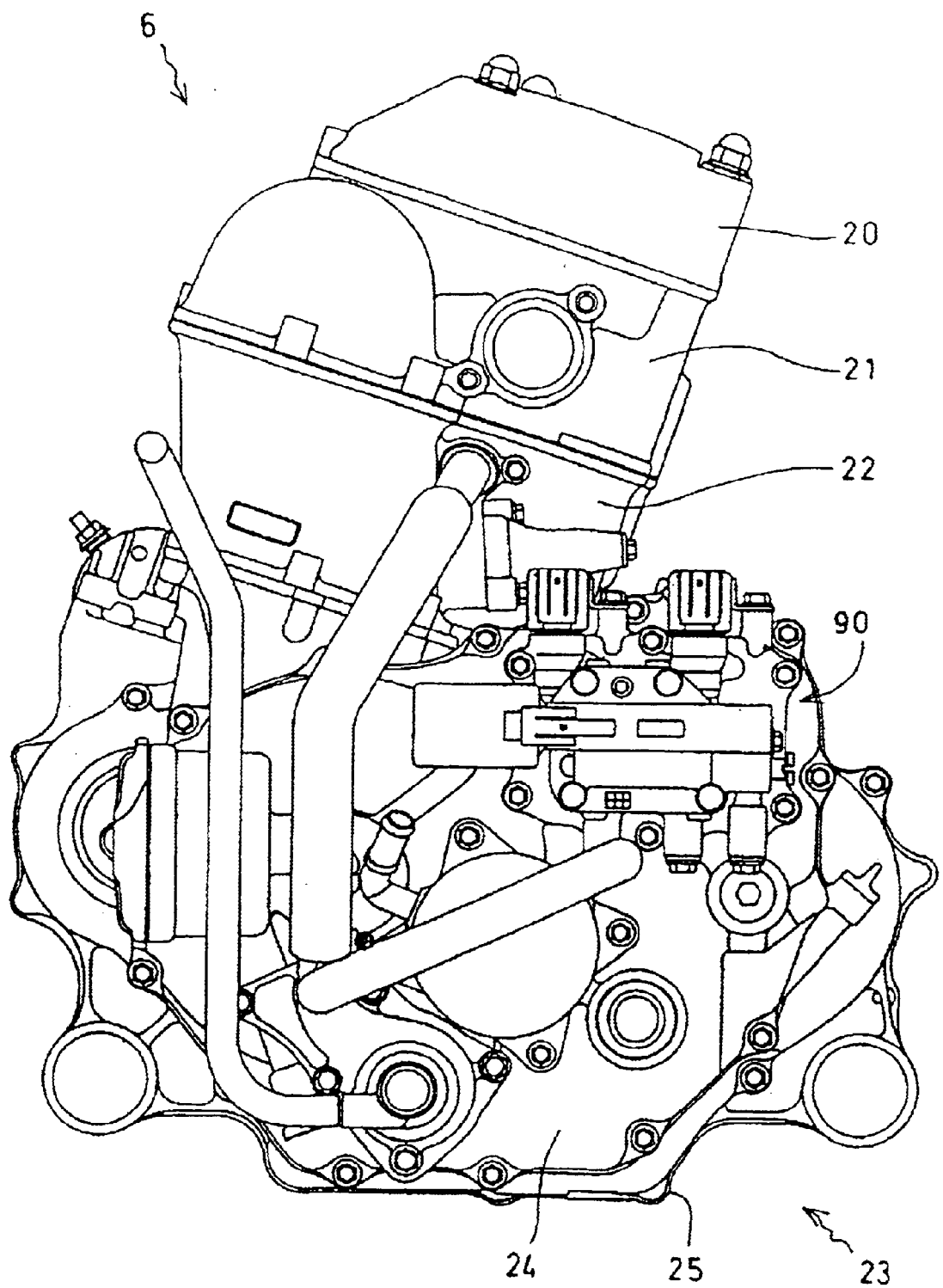
FIG. 2 is a front view showing a power unit according to the present invention.
Figure 3:
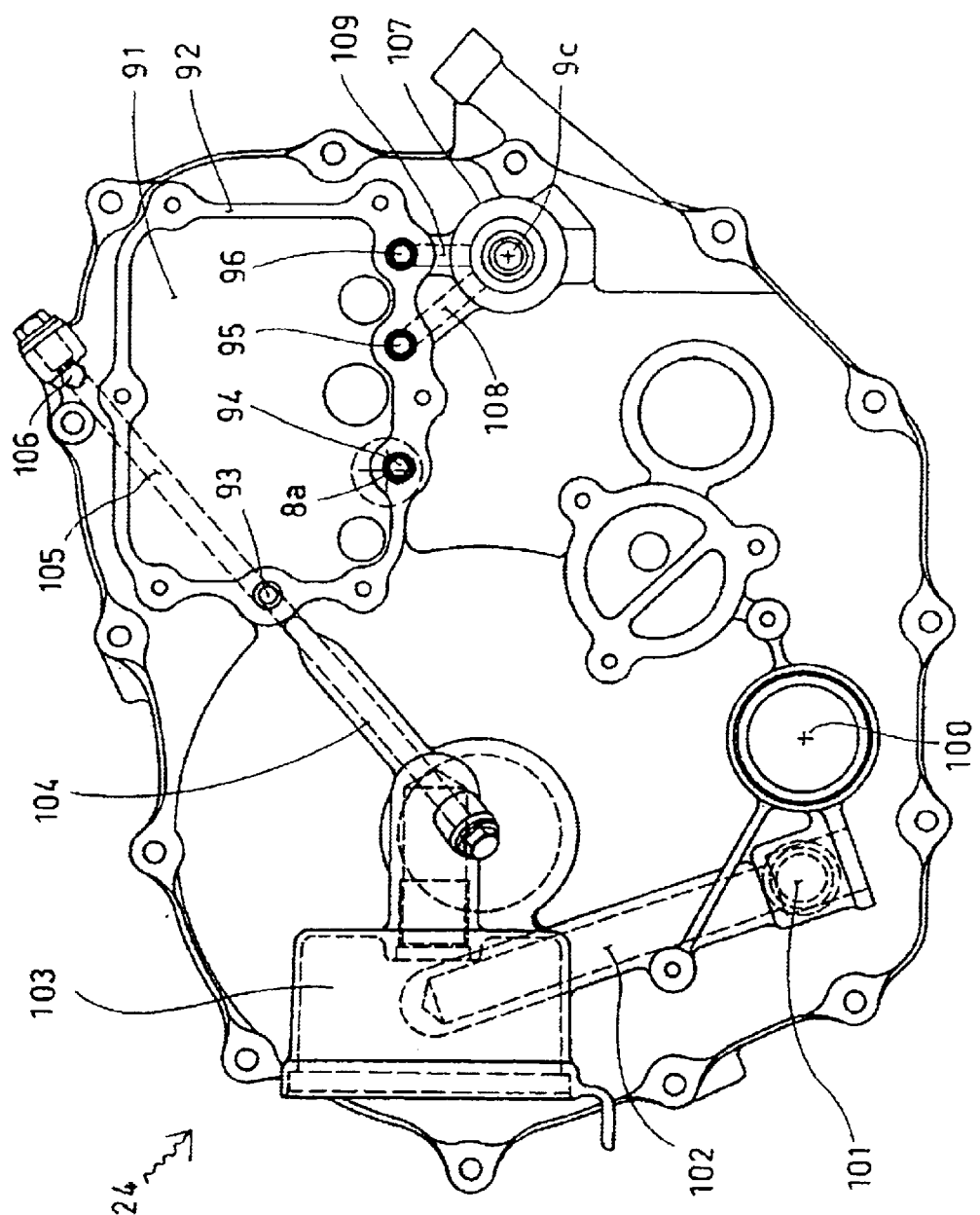
FIG. 3 shows a front crankcase cover viewed from the front.

FIG. 2 is a front view showing the power unit 6 according to the present invention that illustrates the front of the power unit 6. The body of the power unit 6 is roughly composed of four parts, namely, a cylinder head cover 20, a cylinder head 21, a cylinder block 22 and a crankcase 23 in that order from the head. The crankcase 23 is divided into four parts on a face perpendicular to the crankshaft 7 and is composed of a front crankcase cover 24, a front crankcase 25, a rear crankcase 26 and a rear crankcase cover 27 in that order from the front (these are partially shown in FIGS. 5, 6 and 8). In FIG. 2, the front crankcase cover 24 is shown and the front crankcase 25 is slightly shown in the periphery. Various equipment and piping is mounted on the front of the front crankcase cover 24. FIG. 3 shows only the front crankcase cover viewed from the front and FIG. 4 shows the front crankcase 25 viewed from the front.

Figure 4:
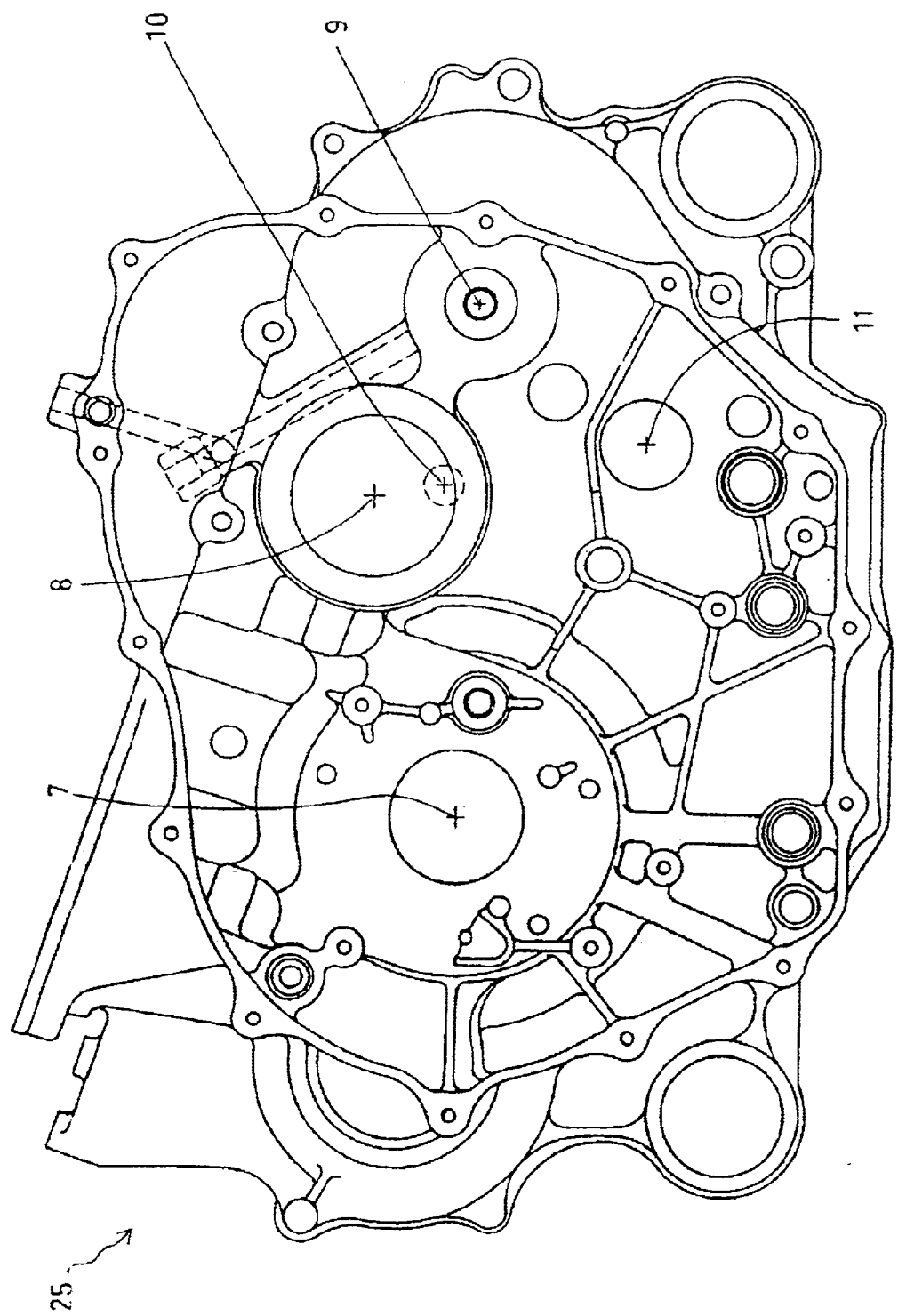
FIG. 4 shows a front crankcase viewed from the front.
Figure 5:
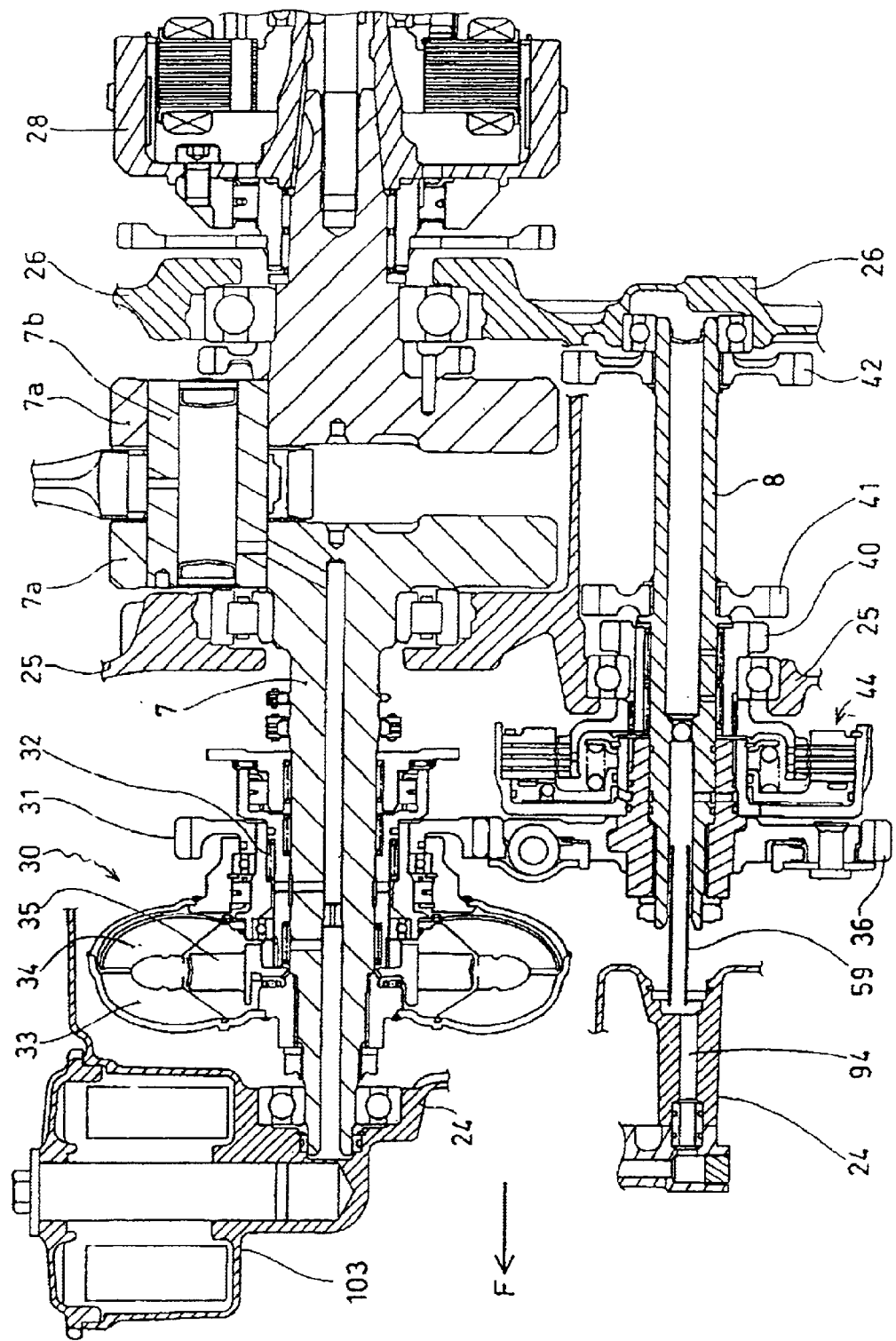
FIG. 5 is a longitudinal section of the inside of a crankcase showing the relationship between a crankshaft and a main shaft.
Figure 6:
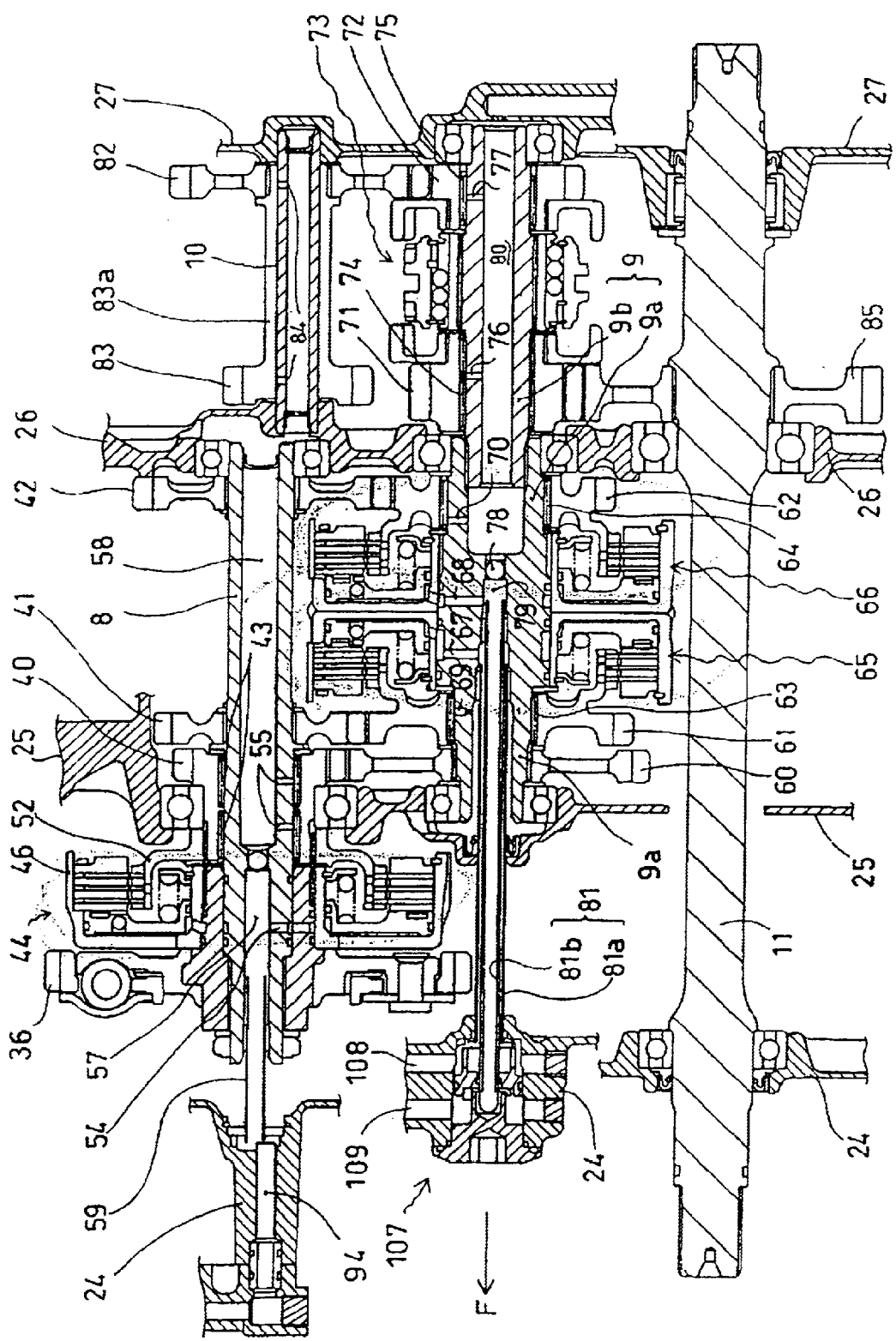
FIG. 6 is a longitudinal section of the inside of the crankcase showing the relationship between the main shaft, a counter shaft, an intermediate shaft and an output shaft.
Figure 8:
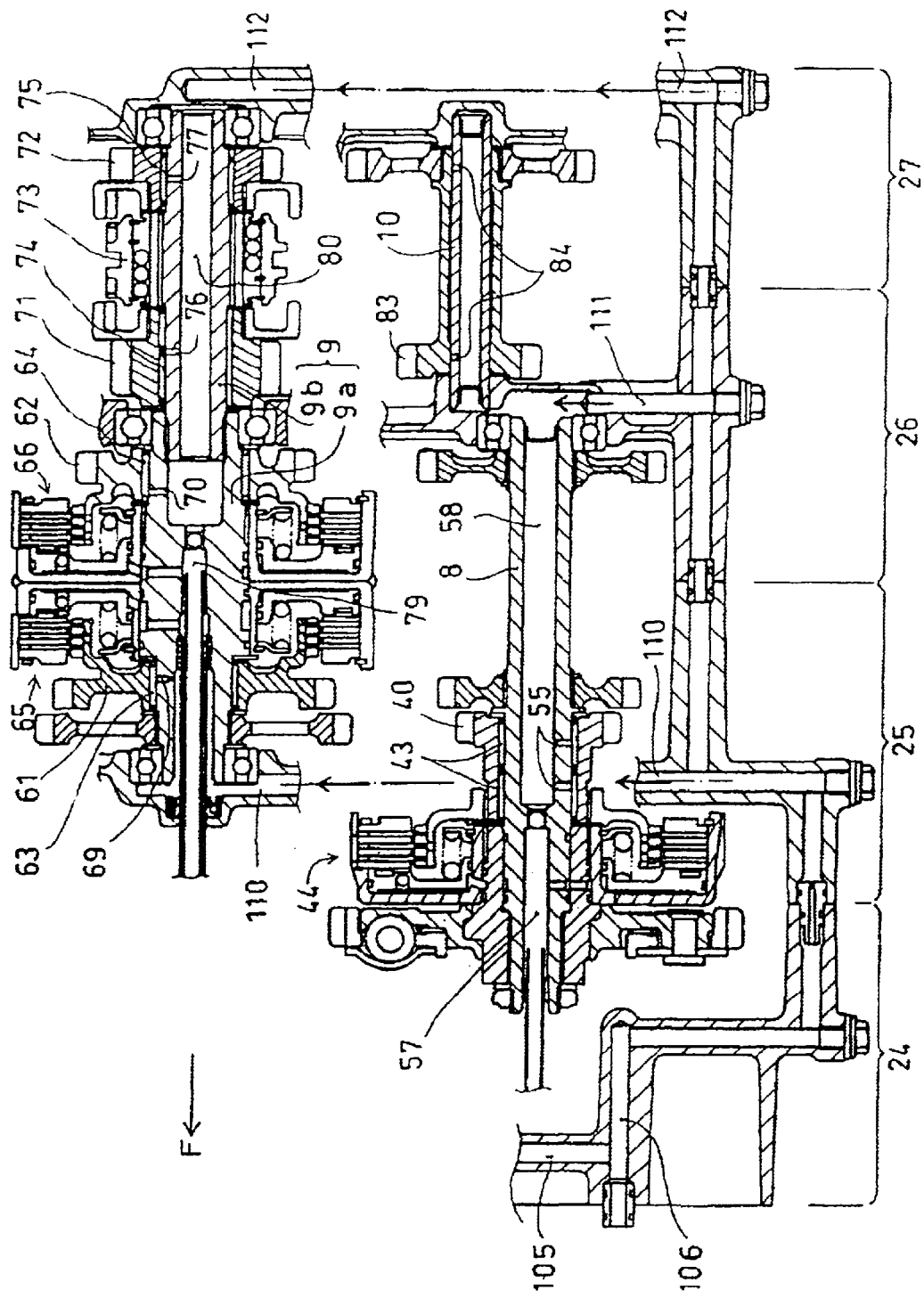
FIG. 8 is a longitudinal section showing an oil passage for supplying lubricating oil.

In FIG. 4, each position of the crankshaft 7, the main shaft 8 of the transmission, the counter shaft 9, the intermediate shaft 10 and the output shaft 11 is shown. FIGS. 5, 6 and 8 are longitudinal sections showing the inside of the crankcase including primary shafts in the crankcase, FIG. 5 shows the relationship between the crankshaft 7 and the main shaft 8, FIG. 6 shows the relationship between the main shaft 8, the counter shaft 9, the intermediate shaft 10 and the output shaft 11. FIG. 8 shows the relationship between the main shaft 8, the counter shaft 9, the intermediate shaft 10 and a lubricating oil supply passage. In these drawings, an arrow F indicates the front.

FIG. 5 shows a power transmission mechanism mounted between the crankshaft 7 and the main shaft 8. The crankshaft 7 is supported by the front and rear crankcases 25 and 26 via a bearing. A front extending part of the crankshaft 7 is supported by the front crankcase cover 24 via a bearing. The crankshaft 7 is divided into front and rear parts and the front and rear parts are connected by a crankpin 7b in a crank web 7a. An alternator 28 that generates power by the revolution of the crankshaft 7 is installed at the rear end of the crankshaft 7.

A primary driving gear 31 is provided to the crankshaft 7 via a torque converter 30. The primary driving gear 31 is held by the crankshaft 7 via a needle bearing 32 so that the driving gear can revolve. The torque converter 30 is provided with a pump impeller 33 fixed to the crankshaft 7, a turbine runner 34 opposite to the pump impeller and a stator 35. The revolvable primary driving gear 31 on the crankshaft 7 is connected to the turbine runner 34 and power from the crankshaft 7 is transmitted to the primary driving gear 31 via hydraulic fluid. A primary driven gear 36 always engaged with the primary driving gear 31 is fixed to the front end of the main shaft 8 of the transmission. The revolution of the crankshaft 7 is transmitted to the main shaft 8 via primary deceleration by the primary driving gear 31 and the primary driven gear 36.

FIG. 6 shows the power transmission mechanism between the main shaft 8 of the transmission, the counter shaft 9, the intermediate shaft 10 and the output shaft 11. The main shaft 8 of the transmission is supported by the front and rear crankcases 25 and 26 via a bearing. A first-speed driving gear 40, a second-speed driving gear 41 and a third-speed driving gear 42, respectively, are different in the number of gear teeth according to gear ratio and are provided on the main shaft 8. The second-speed driving gear 41 and the third-speed driving gear 42 are a fixed gear fixed to the main shaft 8. However, the first-speed driving gear 40 is supported by the main shaft 8 via a needle bearing 43 so that the first-speed driving gear can be rotated. In the following description, generally, a gear held by a needle bearing so that the gear can be rotated around a rotation axis is called an idle gear. A hydraulic multiple disc clutch for the first speed 44 is provided between the main shaft 8 and the first-speed driving gear 40.

Figure 7:
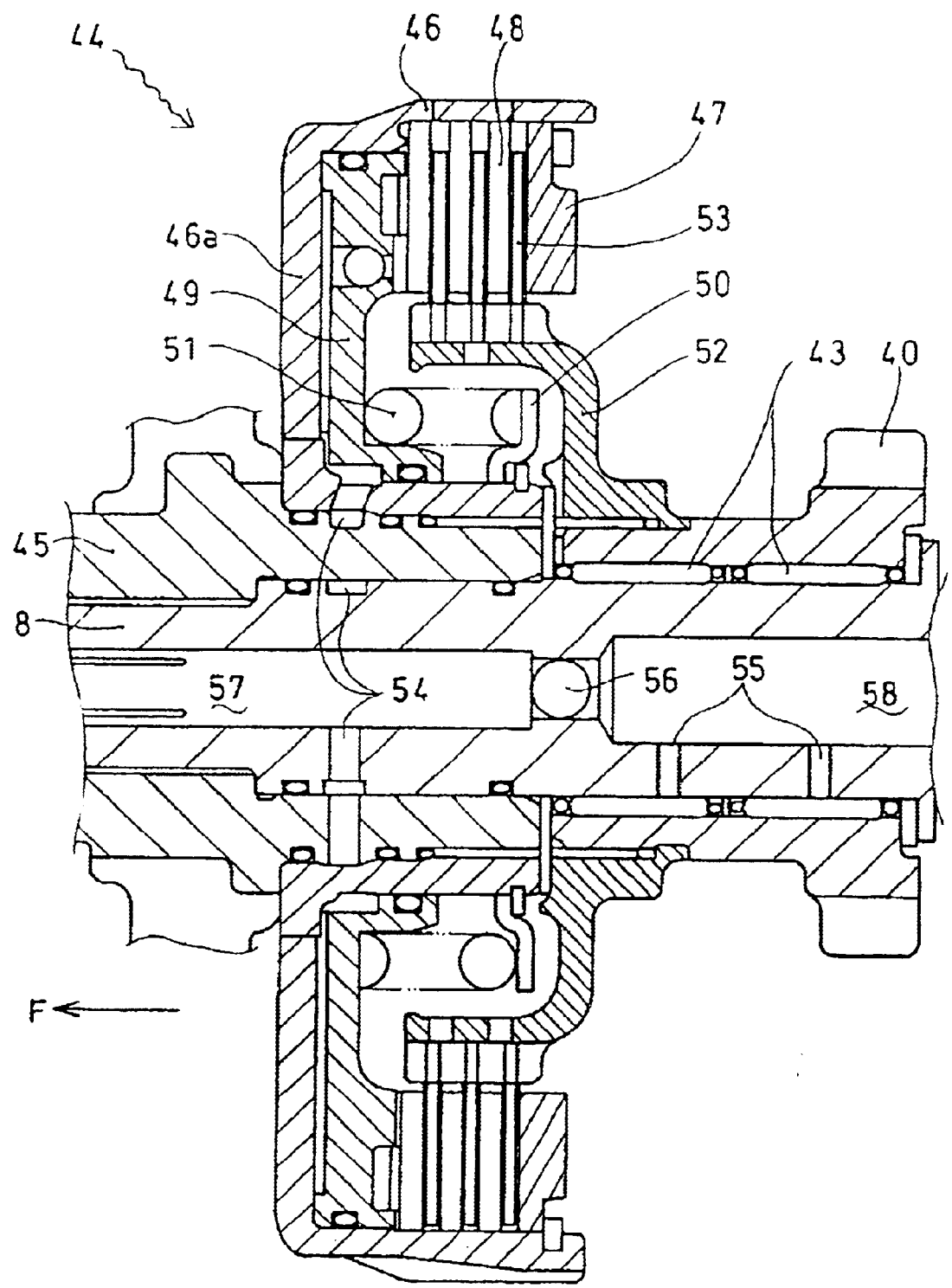
FIG. 7 is an enlarged sectional view for explaining the configuration and the action of a hydraulic multiple disc clutch for the first speed and a first-speed driving gear.

FIG. 7 is an enlarged sectional view for explaining the configuration and the action of the hydraulic multiple disc clutch for the first speed 44 and the first-speed driving gear 40. The hydraulic multiple disc clutch for the first speed 44 is composed of a clutch outer 46 like a container fixed to the main shaft 8 via an outer cylinder 45, a circular stopper 47 fixed to an open end of the clutch outer 46, an outer clutch plate 48 held by the inside face of the clutch outer via a spline so that the outer clutch plate can be axially displaced, a pressure plate 49 adjacent to the bottom wall 46a of the clutch outer 46 and fitted like a piston, a coil spring 51 provided between a fitting part 50 provided to the clutch outer 46 and the pressure plate 49 for pressing the pressure plate 49 toward the bottom wall 46a of the clutch outer 46, a clutch inner 52 integrated with the first-speed driving gear 40 and an inner clutch plate 53 held by the outside face of the clutch inner 52 via a spline so that the inner clutch plate can be axially displaced and alternated with the outer clutch plate 48. A hydraulic fluid supply hole 54 for the hydraulic multiple disc clutch for the first speed 44 is provided inside the main shaft 8, the outer cylinder 45 and the clutch outer 46 and a lubricating oil supply hole 55 for a needle bearing 43 of the first-speed driving gear 40. A central hole, the inside diameter of which varies in a stepped state, is provided on the center line of the main shaft 8, a steel ball 56 is press-fitted in the narrowest part and the central hole is partitioned into a front central hole 57 and a rear central hole 58.

Hydraulic fluid for the clutch 44 is fed from the side of the front crankcase cover 24 to the front central hole 57 via a hydraulic fluid supply pipe 59 as shown in FIG. 6 and is supplied to the clutch 44 via the hydraulic fluid supply hole 54. The hydraulic fluid enters between the bottom wall 46a of the clutch outer 46 and the pressure plate 49 as shown in FIG. 7. The pressure plate 49 is moved against pressure by the coil spring 51 by its oil pressure. The inner and outer clutch plates are axially pressed and the outer clutch plate 48 restrains the movement of the inner clutch plate 53. Hereby, the clutch inner 52 is integrated with the clutch outer 46, the first-speed driving gear 40 which was idle is fixed to the main shaft 8 and the revolution of the main shaft 8 is transmitted to the first-speed driving gear 40. Lubricating oil to the needle bearing 43 supporting the first-speed driving gear 40 is supplied from the side of the rear central hole 58 via the lubricating oil supply hole 55.

The counter shaft 9 is an integrated counter shaft acquired by connecting a front counter shaft 9a and a rear counter shaft 9b. The counter shaft 9 is supported by the front crankcase 25, the rear crankcase 26 and the rear crankcase cover 27 via a bearing. A first-speed driven gear 60, a second-speed driven gear 61 and a third-speed driven gear 62, respectively, always engaged with the first-speed driving gear 40, the second-speed driving gear 41 and the third-speed driving gear 42, respectively, of the main shaft 8 are provided on the front counter shaft 9a. The first-speed driven gear 60 is a fixed gear fixed to the shaft. However, the second-speed driven gear 61 and the third-speed driven gear 62 are an idle gear and are supported by the counter shaft 9 via needle-bearings 63 and 64 so that they can be revolved. A hydraulic multiple disc clutch for the second speed 65 and a hydraulic multiple disc clutch for third speed 66 are provided between the counter shaft 9 and either of these idle gears. The respective clutch outers of these clutches are fixed to the counter shaft 9 and the respective clutch inners are connected to the idle gears. As the configuration and the action of these clutches are similar to those of the hydraulic multiple disc clutch for first speed 44, the detailed description is omitted. In these clutches, the idleness of the idle gears is also stopped by supplying hydraulic fluid via hydraulic fluid supply holes 67 and 68 made in the counter shaft. The transmission of power is enabled and the second-speed or the third-speed reduction is executed. Lubricating oil supply holes 69 and 70 directed towards needle bearings 63 and 64 for supporting the second-speed driven gear 61 and the third-speed driven gear 62 are also made in the counter shaft 9.

A driving gear for normal rotation 71 and a driving gear for reverse rotation 72 are provided to the rear counter shaft 9b. These are both an idle gear, the gear engaged with a manual dog clutch 73 provided in the middle of them is fixed to the shaft and power can be transmitted. Lubricating oil supply holes 76 and 77 for supplying lubricating oil to needle gearings 74 and 75 for supporting the driving gear for normal rotation 71 and the driving gear for reverse rotation 72 are made in the rear counter shaft 9b.

A central bole is formed in the counter shaft 9 in which the front counter shaft 9a and the rear counter shaft 9b are integrated and the central hole is partitioned into a front central hole 79 and a rear central hole 80 by a steel ball 78 press-fitted in the narrowest part. Hydraulic fluid is supplied to the hydraulic multiple disc clutch for the second speed 65 and the hydraulic multiple disc clutch for the third speed 66 via a double tube 81 from the side of the front crankcase cover 24. The double tube 81 is composed of an outer tube 81a and an inner tube 81b. Hydraulic fluid is supplied to the hydraulic multiple disc clutch for the second speed 65 via a fluid passage between the outer tube 81a and the inner tube 81b and the hydraulic fluid supply hole 67. Hydraulic fluid is supplied to the hydraulic multiple disc clutch for the third speed 66 via a fluid passage inside the inner tube 81b and the hydraulic fluid supply hole 68. Lubricating oil to the needle bearing 63 of the second-speed driven gear 61 is supplied from the side of the front crankcase 25 via an oil passage between the front counter shaft 9a and the outer tube 81a and the lubricating oil supply hole 69. Lubricating oil to the needle bearings 64, 74 and 75 of the third-speed driven gear 62, the driving gear for normal rotation 71 and the driving gear for reverse rotation 72 is supplied from the side of the rear crankcase cover 27 via the rear central hole 80 of the counter shaft 9 and the lubricating oil supply holes 70, 76 and 77.

An intermediate shaft 10 is supported by the rear crankcase 26 and the rear crankcase cover 27. A first intermediate gear 82 always engaged with the driving gear for reverse rotation 72 and a second intermediate gear 83 connected to the first intermediate gear 82 via a long sleeve 83a are held by the intermediate shaft 10 so that they can be turned. Lubricating oil to parts for sliding the first intermediate gear 82 and the second intermediate gear 83 on the intermediate shaft 10 is supplied from the rear crankcase 26 via a central hole in the intermediate shaft and a lubricating oil supply hole 84.

The output shaft 11 is supported via a bearing by the front crankcase cover 24, the rear crankcase 26 and the rear crankcase cover 27. The output shaft 11 pierces the front crankcase 25 without being touched to the front crankcase 25. An output shaft driven gear 85 always engaged with the driving gear for normal rotation 71 and the second intermediate gear 83 are fixed to the output shaft 11. The output shaft driven gear 85 is normally rotated or reversely rotated via the gear with which the dog clutch 73 is engaged and rotates the output shaft 11 in a direction suitable for the forward or backward travel of the vehicle. Reverse rotation is controlled so that it is made only when the counter shaft 9 is rotated at first speed.

The gears in the transmission are all constant-mesh gears and it is determined depending upon which clutch of the hydraulic multiple disc clutches 44, 65, 66 is to be connected that any transmission gear ratio is executed. It is a valve body 90 assembled by a solenoid valve and an oil pressure switching valve as an integrated hydraulic control unit that controls oil pressure and the valve body is attached to the front of the front crankcase cover 24 as shown in FIG. 2. The valve body 90 is mounted on a mounting concave portion 91 of the front crankcase cover 24 shown in FIG. 3 and is fixed on a mounting face 92 in the periphery of the mounting concave portion via a gasket. In a state in which the valve body is mounted, a front half of the valve body 90 is exposed to the outside of the front crankcase cover 24 and a rear half is buried in the mounting concave portion 91 of the front crankcase cover 24. The mounting face 92 of the front crankcase cover 24 is formed in parallel with a divided face of the crankcase.

Hydraulic fluid is supplied between the front crankcase cover 24 and the valve body 90 via plural hydraulic fluid inlets provided on the mounting face 92 and plural hydraulic fluid inlets provided in positions opposite to the hydraulic fluid inlets on the mounting face on the side of the valve body 90. Fluid passage holes are provided to the gasket inserted between the valve body 90 and the mounting face of the front crankcase cover 24 in positions corresponding to the plural hydraulic fluid inlets.

In FIG. 3, hydraulic fluid inlets/outlets provided on the valve body mounting face 92 of the front crankcase cover 24 are shown. In detail, they are a hydraulic fluid supply port 93 from the front crankcase cover 24 towards the valve body 90, a hydraulic fluid inlet 94 from the valve body 90 towards the hydraulic multiple disc clutch for first speed, a hydraulic fluid inlet 95 from the valve body 90 towards the hydraulic multiple disc clutch for second speed and a hydraulic fluid inlet 96 from the valve body 90 towards the hydraulic multiple disc clutch for the third speed.

As shown in FIG. 3, an extended position 100 of the center line of a pump shaft is provided of an oil pump not shown. The oil pump is provided between the front crankcase cover 24 and the front crankcase 25. Oil fed from the oil pump is fed to an oil filter 103 via oil passages 101 and 102 made inside the wall of the front crankcase cover 24. After the oil filter filters out foreign matter from the oil, the oil is fed via an oil passage 104 and a part of the oil is fed to the valve body 90 from the hydraulic fluid supply port 93. The other part of the oil is fed via an oil passage 105 and an oil passage 106 perpendicular to the oil passage 105 and extends in a direction of the front crankcase 25 as hydraulic fluid for the torque converter or lubricating oil for the bearing.

As shown in FIG. 3, an extended position 8a of the center line of the main shaft 8 of the transmission is provided. Hydraulic fluid fed to the hydraulic fluid inlet 94 from the valve body 90 towards the hydraulic multiple disc clutch for the first speed 44 is fed into the front central hole 57 via the hydraulic fluid supply pipe 59 laid from the rear of the front crankcase cover 24 into the front central hole 57 of the main shaft 8 as shown in FIG. 6 and is supplied to the hydraulic multiple disc clutch for the first speed 44.

As shown in FIG. 3, an extended position 9c of the center line of the counter shaft 9 is provided. A fluid passage connecting part 107 is provided in this part of the front crankcase cover 24, and fluid passages 108 and 109 are formed from the inlet 95 of hydraulic fluid towards the hydraulic multiple disc clutch for second speed 65 and the inlet 96 of hydraulic fluid towards the hydraulic multiple disc clutch for the third speed 66 to the fluid passage connecting part 107. Hydraulic fluid fed from the valve body 90 to the hydraulic fluid inlet 95 or the hydraulic fluid inlet 96 is fed into the front central hole 79 via either inner or outer passage of the double tube for supplying hydraulic fluid 81 supplied from the fluid passage connecting part 107 into the front central hole 79 of the counter shaft 9 as shown in FIG. 6 and thereafter supplied to the hydraulic multiple disc clutch for second speed 65 or the hydraulic multiple disc clutch for third speed 66.

FIG. 8 is a longitudinal section showing an oil passage for supplying lubricating oil continuing to the oil passages 105 and 106 shown in FIG. 3. The oil passage for supplying lubricating oil is acquired by connecting oil holes made in the periphery of four crankcases, that is, the front crankcase cover 24, the front crankcase 25, the rear crankcase 26 and the rear crankcase cover 27. As described above, hydraulic fluid for the clutches is all directly supplied from the front crankcase cover 24. However, lubricating oil for the bearings for the gears for shifting is supplied from the oil passages of the front crankcase 25, the rear crankcase 26 and the rear crankcase cover 27.

An oil passage 110 bored in the front crankcase 25 is an oil passage for supplying lubricating oil to the needle bearing 63 of the second-speed driven gear 61 of the counter shaft 9 via the lubricating oil supply hole 69. An oil passage 111 bored in the rear crankcase 26 is an oil passage for supplying lubricating oil to the needle bearing 43 of the first-speed driving gear 40 of the main shaft 8 via the lubricating oil supply hole 55 and for supplying lubricating oil to the part for sliding the second intermediate gear 83 on the intermediate shaft 10 via the lubricating oil supply hole 84. An oil passage bored in the rear crankcase cover 27 is an oil passage for supplying lubricating oil to the needle bearing 64 of the third-speed driven gear 62 of the counter shaft 9 via the lubricating oil supply hole 70, for supplying lubricating oil to the needle bearing 74 of the driving gear for normal rotation 71 via the lubricating oil supply hole 76 and further, for supplying lubricating oil to the needle bearing 75 of the driving gear for reverse rotation 72 via the lubricating oil supply hole 77.

In this embodiment, the main shaft 8 and the counter shaft 9 are respectively provided in parallel with the crankshaft 7.

The revolution of the torque converter 30 provided to the crankshaft 7 is transmitted to the main shaft 8 via the primary gear. Further, speed is shifted by the first-speed, second-speed and third-speed gears for shifting and the hydraulic multiple disc clutches for the first speed, the second speed and the third speed for connecting or disconnecting the idle gear of the gears and the revolving shaft, respectively, provided on the main shaft 8 and the counter shaft 9.

As the axial dimension is long when three sets of the hydraulic multiple disc clutch and the idle gear connected to the clutch are arranged on one shaft, it is desirable that one clutch and one idle gear connected to the clutch are arranged on one shaft and two clutches and two idle gears connected to the clutches are arranged on another shaft to reduce the axial length.

The hydraulic multiple disc clutch is a unit having a large outside diameter. Therefore, as the center distance is too large when clutches arranged on two shafts are opposed, it is desirable that the clutches on the main shaft and on the counter shaft are set off in positions not opposite to reduce the center distance.

Units having a large outside diameter such as the torque converter, the crank web and the alternator are provided to the crankshaft. As a shaft of the transmission closest to the crankshaft is the main shaft, it is desirable that no hydraulic multiple disc clutch is arranged in positions on the main shaft opposite to the torque converter, the crank web and the alternator and the center distance between the crankshaft and the main shaft is reduced.

As it is valid that more clutches are arranged on the shaft farther from the crankshaft to meet the conditions described above, two clutch are arranged on the counter shaft and one clutch is arranged on the main shaft.

The crank web is supported between a pair of crankshaft supports, and a crankshaft support, a main shaft support and a counter shaft support are located in substantially the same axial position, that is, in opposite positions. The one clutch on the main shaft is arranged on the front side of the main shaft support to avoid interference between the clutch and the crank web and interference between the clutch and the alternator provided to the rear of the crankshaft, and is arranged off the torque converter to avoid interference between the clutch and the torque converter. As a result, a pair of primary gears are installed between the torque converter provided to the crankshaft and the clutch provided to the main shaft.

As described above, even if the clutch is arranged in a position corresponding to the crank web on the adjacent counter shaft because no clutch is arranged in a position on the main shaft corresponding to the crank web, no interference with equipment having a large diameter is caused. For such a reason, the other two clutches are arranged side by side in positions corresponding to the crank web on the counter shaft. Idle gears connected to these two clutches are arranged on both sides of the two clutches. The fixed gears engaged with the two idle gears are arranged on the main shaft and are arranged apart inside the supports of the main shaft and in positions close to the supports on both sides for correspondence to the positions of the idle gears. The idle gear connected to the clutch arranged on the main shaft is arranged between the clutch arranged on the main shaft and the gear on the front side of the fixed gears on the main shaft. The fixed gear on the counter shaft engaged with the idle gear connected to the clutch arranged on the main shaft is necessarily arranged before the idle gear on the front side of the counter shaft. The arrangement in this embodiment of the clutches and the gears is based upon reason and hereby, the transmission can be miniaturized and lightened.

The idle gears connected to the two clutches arranged side by side in positions corresponding to the crank web on the counter shaft are arranged on both sides of the two clutches. The fixed gears engaged with the two idle gears are arranged on the main shaft and are arranged apart inside the supports of the main shaft and in positions close to the supports on both sides for correspondence to the positions of the idle gears. Therefore, as the deflection of the main shaft is reduced, the main shaft can be thinned. As the partial clutches are arranged on the counter shaft corresponding to the thin shaft, the center distance between the main shaft and the counter shaft can be reduced and the transmission can be miniaturized and lightened.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A transmission provided with a main shaft and a counter shaft, respectively, provided in parallel with a crankshaft for transmitting the revolution of a torque converter provided to the crankshaft to the main shaft via a gear and further, shifting speed at three steps by gears provided on the main shaft and the counter shaft and hydraulic clutches for connecting or disconnecting the gears, comprising:
    a first-speed driving gear revolvably mounted on the main shaft;
    a first-speed hydraulic clutch arranged on the main shaft outside a pair of supports for supporting the main shaft, said first-speed hydraulic clutch being operatively mounted for selectively actuating the first-speed gear;
    a second-speed driving gear and a third-speed driving gear fixed to the main shaft and spaced apart on both sides of the main shaft and positioned close to and inside the supports for supporting the main shaft;
    a first-speed driven gear engaged with the first-speed driving gear, said first-speed driven gear being fixed to the counter shaft;
    a second-speed driven gear and a third-speed driven gear engaged with the second-speed driving gear and the third-speed diving gear, respectively, said second-speed driven gear and the third-speed driven gear being revolvably mounted on the counter shaft and arranged in positions spaced apart and on both sides of the counter shaft close to and inside the supports of the main shaft; and
    a second-speed hydraulic clutch and a third-speed hydraulic clutch operatively positioned on the counter shaft for selectively connecting or disconnecting the second-speed driven gear and the third-speed driven gear relative to the counter shaft, respectively, said second-speed hydraulic clutch and said third-speed hydraulic clutch being arranged between the second-speed driven gear and the third-speed driven gear.

2. The transmission provided with a main shaft and a counter shaft according to claim 1, wherein the first-speed driving gear includes a portion that is disposed inside the supports for supporting the main shaft and an extended portion that extends outside the supports for being operatively connected to said first-speed hydraulic clutch.

3. The transmission provided with a main shaft and a counter shaft according to claim 1, wherein the second-speed driving gear is disposed adjacent to and axially displaced relative to said first-speed driving gear.

4. The transmission provided with a main shaft and a counter shaft according to claim 1, wherein the first-speed driven gear is positioned on said counter shaft and is adjacent to and inside the supports for supporting the main shaft.

5. The transmission provided with a main shaft and a counter shaft according to claim 1, wherein the second-speed driven gear is positioned on said counter shaft and is disposed adjacent to and axially displaced relative to said first-speed driven near.

6. The transmission provided with a main shaft and a counter shaft according to claim 1, wherein the third-speed driving gear fixed to the main shaft is spaced a predetermined distance relative to the first and second-speed driving gears.

7. The transmission provided with a main shaft and a counter shaft according to claim 1, wherein the third-speed driven gear revolvable mounted on the counter shaft is spaced a predetermined distance relative to the second-speed driven gear revolvable of the counter shaft.

8. A transmission provided with a main shaft and a counter shaft, respectively, provided substantially in parallel with a crankshaft for transmitting the revolution of a torque converter provided to the crankshaft to the main shaft via a gear and further, shifting speed at three steps by gears provided on the main shaft and the counter shaft and hydraulic clutches for connecting or disconnecting the gears, comprising:
    a first driving gear revolvably mounted on the main shaft;
    a first hydraulic clutch operatively positioned on the main shaft and displaced a predetermined distance outside a pair of supports for supporting the main shaft;
    a second driving gear fixed to the main shaft and spaced a predetermined distance inside the supports for supporting the main shaft;
    a first driven gear fixed relative to the counter shaft, said first driven gear being engaged with the first driving gear;
    a second driven gear engaged with the second driving gear, said second driven gear being revolvable mounted on the counter shaft and arranged at a position on the counter shaft inside of the supports of the main shaft; and
    a second hydraulic clutch for selectively connecting or disconnecting the second driven gear relative to the counter shaft, said second hydraulic clutch being positioned inside the supports for supporting the main shaft.

9. The transmission provided with a main shaft and a counter shaft according to claim 8, wherein said first driving gear revolvably mounted on the main shaft is a first-speed driving gear.

10. The transmission provided with a main shaft and a counter shaft according to claim 9, wherein the second driving gear fixed to the main shaft is a second-speed driving gear.

11. The transmission provided with a main shaft and a counter shaft according to claim 8, wherein the first driven gear fixed on the counter shaft is a first-speed driven gear.

12. The transmission provided with a main shaft and a counter shaft according to claim 11, wherein the second driven gear revolvable on the counter shaft is a second-speed driven gear.

13. The transmission provided with a main shaft and a counter shaft according to claim 8, and further including a third-speed driving gear fixed to the main shaft and being spaced a predetermined distance relative to the first driving gear and the second driving gear.

14. The transmission provided with a main shaft and a counter shaft according to claim 13, and further including a third-speed driven gear revolvable on the counter shaft and being spaced a predetermined distance relative to the first driven gear and the second driven gear.

* * * * *